J. S. & W. F. BROWNE.
Horse Hay-Fork.
No. 63,608. Patented April 9, 1867.
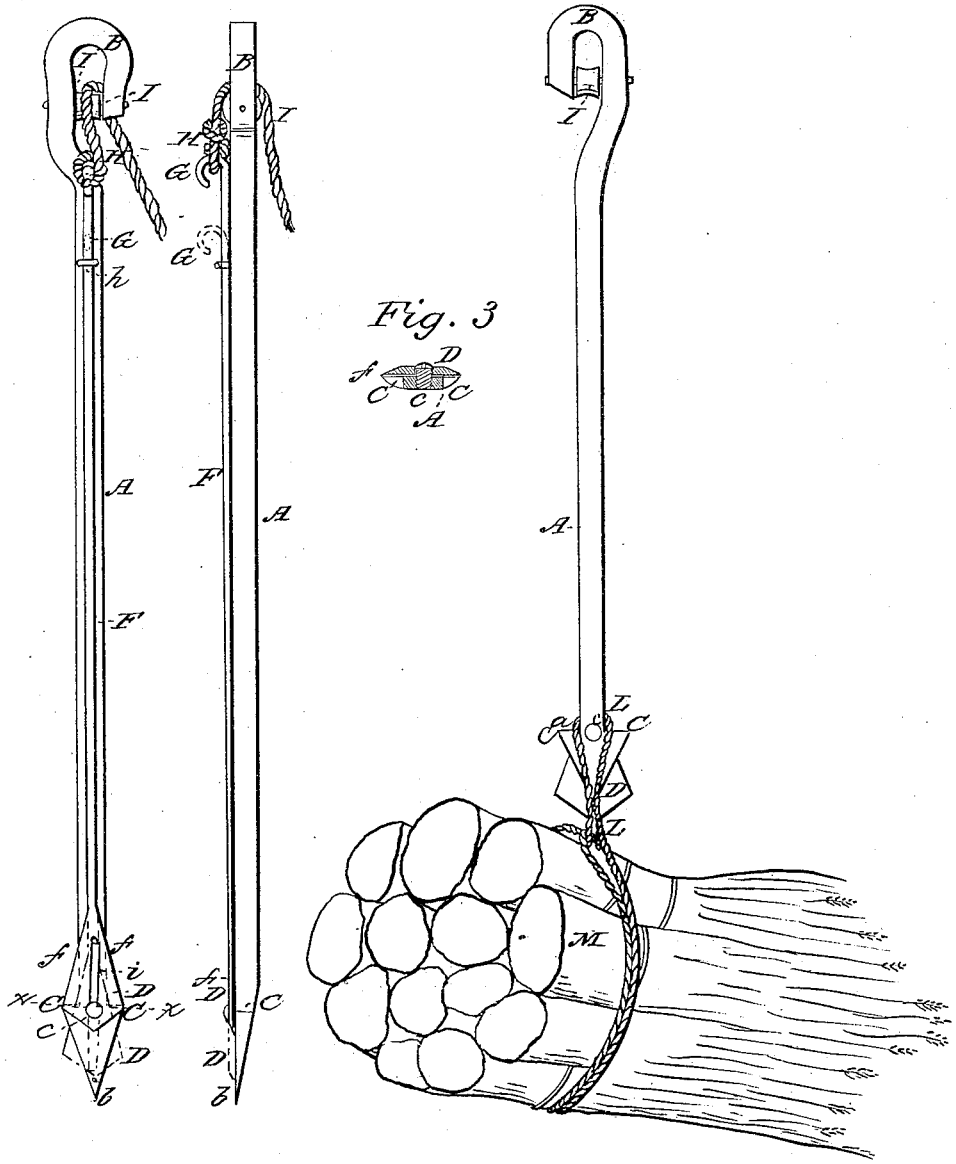

United States Patent Office.

J. S. BROWN AND WILLIAM FRANK BROWNE, OF WASHINGTON, DISTRICT OF COLUMBIA.

Letters Patent No. 63,608, dated April 9, 1867.

IMPROVEMENT IN HORSE HAY-FORKS.

*The Schedule referred to in these Letters Patent and making part of the same.*

TO ALL WHOM IT MAY CONCERN:

Be it known that we, J. S. BROWN and WILLIAM FRANK BROWNE, of Washington, in the county of Washington, and District of Columbia, have invented an improved Elevator for Hay, Grain, and other articles; and we do hereby declare that the following is a full and exact description thereof, reference being had to the accompanying drawings, making part of this specification—

Figure 1 being a side view of the instrument.

Figure 2, an edge view thereof.

Figure 3, a transverse section in a plane indicated by the line x x, fig. 1.

Figure 4, a side view of the fork as applied to raising grain in bundles and other articles without piercing them.

Like letters designate corresponding parts in all of the figures.

A shaft, A, with a hook, B, at the upper end to lift it by, and having fixed barbs or shoulders, C C, near the lower end to take hold of the hay or other material, and a sliding-bar, D, to be raised by a rod, F, which extends up by the side of the shaft, compose the principal parts of the instrument. The point b of the shaft is made sufficiently acute to readily penetrate the hay, the edges of the wedge portion terminating at the shoulders C C. The bar D is thin and has a single vertical slot, i, in it of a length sufficient to allow the requisite sliding movement of the bar. A headed pin, c, screwed into the shaft through this slot, guides and limits the movement of the sliding-bar. The lower end of the bar terminates in a point which may be more obtuse than that of the shaft, and its lower edges are bevelled or rounded so as to offer very little resistance to the penetration of the instrument. The bar when raised to its highest position is as wide as the shoulders C C, directly opposite to or over them, (as shown in fig. 1,) and it narrows thence upward in wedge form to the upper end, substantially as represented. Thus, when the bar is drawn up these wedge-acting upper edges, ff, cast off the hay from the shoulders C C, and trip it from the instrument. Our improvement in this part of the instrument consists in making these upper edges ff of the bar-shaft so as to cut the hay when the bar is drawn up, and thereby more easily cast off the hay from the barbs or shoulders C C, than thick edges acting solely to force the hay outward can. The bar D is generally made of cast steel, and therefore the edges, once sharpened, will retain their sharpness long enough for practical use. When the instrument is driven into the hay, the bar D slides upward automatically so as not to interfere with the operation; and when the instrument begins to be raised, the bar also automatically slides down under the pressure and resistance of the hay, thus uncovering the barbs or shoulders. But, when the hay is hoisted to its place in order to trip it from the instrument, the bar D has to be drawn up by force. For this purpose a cord, H, is attached to a hook or ring, G, on the upper end of the rod F, and extends thence up through the hook B, and then down to the operator. In order to avoid undue friction and make the tripping of the instrument easy, there is a pulley, I, just within the point of the hook, closing the mouth thereof for the tripping cord H to pass over. This construction of the upper end of the shaft with a hook, instead of a ring, eye, or loop, so as to avoid the expense of welding, drilling, or splitting, and the pulley located in the mouth of the hook, thus closing it, is of the utmost simplicity and effectiveness. The upper end of the rod F is kept in position by a staple or band, h, secured in or around the shaft. The instrument, as thus constructed, is entirely suitable for raising hay, straw, or any similar material in free mass. And for lifting hay and other fibrous materials in bundles or bales, it may be precisely the same, except that it is better to have the point b even more acute, so as more readily to penetrate the compressed substance, and to make the barbs or shoulders C C quite narrow, as fully sufficient to hold, and as offering less resistance to the penetration and tripping of the instrument. For raising sheaves of grain and other small bundles, several at a time, there may be a number (say five or six) of the instruments, made quite small, hung together, and arranged so as to raise all the bars together by one cord, and trip all at once.

But for general use in raising grain in sheaves we employ a single instrument precisely as above described, except the upper edges ff of the bar are not sharpened, in connection with a band, L, having a loop, a, which is merely hung over the shoulders C C, substantially as shown in fig. 4. A noose is made with the band L around any convenient number of sheaves or bundles, M, as indicated, and the projecting end thereof, which terminates in the loop a, is thrown over the barbs or shoulders of the instrument, as above specified. The instrument is then raised to the place desired; and, on raising the bar D, the band is tripped from the shoulders as readily as is a bunch of hay. The stacker then draws out the band and returns it for use again. Two or three such bands of common cord or large twine are sufficient for stacking or storing grain, or for any similar purpose. By this simple means the instrument becomes applicable to many more uses than for simply raising hay and straw in loose mass.

What we claim as our invention, and desire to secure by Letters Patent, is—

Sharpening the upper edges $f f$ of the tripping-bar, in combination with the shoulders C C, substantially as described for the purpose herein specified.

We also claim the combined construction and arrangement of the hook B, and pulley I, located in and closing the mouth of the hook, substantially as and for the purpose herein specified.

We also claim the combination of the elevator, substantially as herein described, and a noose-band, L, substantially as and for the purpose herein specified.

J. S. BROWN,
WM. FRANK BROWNE.

Witnesses:
　THOMAS T. PARKER,
　FRANCIS A. FOLLETT.